US010703663B2

(12) United States Patent
Flynn (10) Patent No.: US 10,703,663 B2
(45) Date of Patent: Jul. 7, 2020

(54) OPERATING MECHANISM FOR A GLASSWARE FORMING MACHINE

(71) Applicant: Owens-Brockway Glass Container Inc., Perrysburg, OH (US)

(72) Inventor: Robin L Flynn, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 21 days.

(21) Appl. No.: 15/463,337

(22) Filed: Mar. 20, 2017

(65) Prior Publication Data

US 2018/0265389 A1    Sep. 20, 2018

(51) Int. Cl.
*C03B 9/353* (2006.01)
*C03B 9/40* (2006.01)
*C03B 9/41* (2006.01)

(52) U.S. Cl.
CPC .............. *C03B 9/403* (2013.01); *C03B 9/353* (2013.01); *C03B 9/3537* (2013.01); *C03B 9/41* (2013.01)

(58) Field of Classification Search
CPC .......... C03B 9/40; C03B 9/3537; C03B 9/403
See application file for complete search history.

(56) References Cited

U.S. PATENT DOCUMENTS

| 2,738,748 | A | * | 3/1956 | Hecht | B21D 24/12 |
| | | | | | 100/286 |
| 3,278,989 | A | * | 10/1966 | Neubauer | B22D 17/26 |
| | | | | | 425/355 |
| 3,418,692 | A | * | 12/1968 | Valyi | B29C 45/6714 |
| | | | | | 164/341 |
| 3,528,796 | A | | 9/1970 | Trahan | |
| 4,224,263 | A | * | 9/1980 | Kontz | B29C 49/12 |
| | | | | | 264/458 |
| 4,375,979 | A | | 3/1983 | Newkirk et al. | |
| 4,449,996 | A | * | 5/1984 | Irwin | C03B 9/3537 |
| | | | | | 65/305 |
| 4,589,830 | A | * | 5/1986 | Clawson | B29C 45/844 |
| | | | | | 192/143 |

(Continued)

FOREIGN PATENT DOCUMENTS

WO    WO2013/040510 A1    3/2013

OTHER PUBLICATIONS

International Search Report and Written Opinion, Int. Serial No. PCT/US2018/021435, Int. Filing Date: Mar. 8, 2018, Applicant: Owens-Brockway Glass Container Inc., dated Jun. 19, 2018.

*Primary Examiner* — John M Hoffmann (57) ABSTRACT

A mold operating mechanism to open and close molds of a glassware forming machine. The mechanism includes a drivetrain assembly including a frame, a gearset carried by the frame and configured to be driven by a powertrain assembly, at least one operating shaft carried by the frame and driven by the gearset, and at least one linkage operatively coupled to the operating shaft and configured to be operatively coupled to a mold carrier carrying at least a portion of one or more molds. The mechanism includes further a fluid cylinder disposed proximate the linkage and including at least one piston rod operatively coupled to the linkage, wherein as the linkage rotates, the piston rod is pulled outward from the cylinder, and the cylinder is dragged outwardly, and whereafter the cylinder is pressurized with fluid to push the piston rod further outward to apply clamping pressure to the linkage.

11 Claims, 9 Drawing Sheets

(56) References Cited

U.S. PATENT DOCUMENTS

| | | | |
|---|---|---|---|
| 4,810,278 A | | 3/1989 | Braithwaite |
| 4,832,727 A | | 5/1989 | Libert |
| 4,883,524 A | * | 11/1989 | Bristol ............. B29D 11/00028 65/37 |
| 5,342,258 A | * | 8/1994 | Egyed ....................... F16H 3/66 475/280 |
| 5,569,313 A | | 10/1996 | Meyer |
| 5,578,105 A | | 11/1996 | Meyer |
| 5,824,131 A | | 10/1998 | Grant et al. |
| 6,009,727 A | | 1/2000 | Grant et al. |
| 6,254,378 B1 | | 7/2001 | Berghoff |
| 6,386,000 B1 | | 5/2002 | Fenton et al. |
| 6,634,414 B2 | * | 10/2003 | Miller .................... B22D 17/26 164/312 |
| 6,638,046 B1 | * | 10/2003 | Gillen .................... B29C 33/20 425/117 |
| 7,451,622 B2 | | 11/2008 | Fenton |
| 7,845,193 B2 | | 12/2010 | Cramer |
| 8,047,022 B2 | | 11/2011 | Cramer |
| 8,414,287 B2 | | 4/2013 | Wohlrab |
| 2004/0091570 A1 | | 5/2004 | Wohlrab et al. |
| 2017/0121208 A1 | * | 5/2017 | Engelking ............. C03B 9/3537 |

* cited by examiner

OPERATING MECHANISM FOR A GLASSWARE FORMING MACHINE

The present disclosure is directed to glassware manufacturing and, more particularly, to operating mechanisms of glassware forming machines that are used to open and close molds of a glassware forming machine.

BACKGROUND AND SUMMARY OF THE DISCLOSURE

Glassware forming machines typically employ one or more motor-driven mold operating mechanisms to open and close molds or blanks of the glassware forming machine. Each operating mechanism may include, for example and among other components, a mold carrier carrying at least a portion of one or more molds or blanks. In an example, the glassware forming machine may include two such operating mechanisms that are configured and operable to work together to open the molds or blanks of the machine by moving the respective mold carriers thereof away from one another along a linear path, and to close the molds or blanks by moving the mold carriers toward one another along the same linear path. In other words, the operating mechanisms may comprise parallel open and close type mechanisms that move portions of the molds or blanks toward and away from each other along parallel paths.

A general object of the present disclosure, in accordance with one aspect of the disclosure, is to provide a motor-driven mold operating mechanism for a glassware forming machine that allows for an increased clamping force to be applied to one or more components of the mold operating mechanism once the mold carrier has reached a closed position.

The present disclosure embodies a number of aspects that can be implemented separately from, or in combination with, each other.

In accordance with an aspect of the disclosure, there is provided a fluid-assisted, motor-driven, mold operating mechanism to open and close molds of a glassware forming machine that open away from one another and close toward one another. The operating mechanism includes: a base frame; guide blocks and bearings mounted on the base frame; and a mold carrier carrying at least a portion of one or more molds and slidably coupled to the base frame via the guide blocks and bearings. The operating mechanism includes further a powertrain assembly and a drivetrain assembly. The drivetrain assembly is carried between the guide blocks mounted on the base frame and includes: a gearset carried by the base frame and operatively coupled to and driven by the powertrain assembly; operating shafts carried by the base frame and operatively coupled to and driven by the gearset; and linkages operatively coupled to the operating shafts and to the mold carrier. The operating mechanism includes still further a dual piston fluid cylinder disposed between the linkages and including dual piston rods operatively coupled to the linkages, wherein the powertrain assembly rotates the linkages, thereby pushing the mold carrier outwardly, pulling the piston rods outward from the dual piston cylinder, and dragging the cylinder outwardly, and whereafter, the cylinder is pressurized with fluid to push the piston rods further outward to apply clamping pressure to the linkages to force the mold carrier to a closed position.

In accordance with another aspect of the disclosure, there is provided a fluid-assisted, motor-driven, mold operating mechanism to open and close molds of a glassware forming machine that open away from one another and close toward one another. The operating mechanism includes: a base frame; at least one guide block and bearing mounted on the base frame; and a mold carrier carrying at least a portion of one or more molds and slidably coupled to the base frame via the at least one guide block and bearing. The operating mechanism includes further a powertrain assembly and a drivetrain assembly. The drivetrain assembly is mounted on the base frame and includes: a gearset carried by the base frame and operatively coupled to and driven by the powertrain assembly; at least one operating shaft operatively coupled to and driven by the gearset; and at least one linkage operatively coupled to the at least one operating shaft and to the mold carrier. The operating mechanism includes still further a fluid cylinder disposed proximate the at least one linkage and including at least one piston rod operatively coupled to the at least one linkage, wherein the powertrain assembly rotates the at least one linkage, thereby pushing the mold carrier outwardly, pulling the at least one piston rod outward from the cylinder, and dragging the cylinder outwardly, and whereafter, the cylinder is pressurized with fluid to push the at least one piston rod further outward to apply clamping pressure to the at least one linkage to force the mold carrier to a closed position.

According to another aspect of the disclosure, a fluid-assisted, motor-driven, mold operating mechanism to open and close molds of a glassware forming machine that open away from one another and close toward one another is provided. The operating mechanism includes a drivetrain assembly including: a frame; a gearset carried by the frame and configured to be driven by a powertrain assembly; at least one operating shaft carried by the frame and operatively coupled to and driven by the gearset; and at least one linkage operatively coupled to the at least one operating shaft and configured to be operatively coupled to a mold carrier carrying at least a portion of one or more molds. The operating mechanism includes further a fluid cylinder disposed proximate the at least one linkage and including at least one piston rod operatively coupled to the at least one linkage, wherein as the at least one linkage rotates, the at least one piston rod is pulled outward from the cylinder, and the cylinder is dragged outwardly, and whereafter, the cylinder is pressurized with fluid to push the at least one piston rod further outward to apply clamping pressure to the at least one linkage.

In accordance with yet another aspect of the disclosure, there is provided a method of actuating a motor-driven mold operating mechanism to open and close molds of a glassware forming machine that open away from one another and close toward one another. The method includes causing a mold carrier carrying at least a portion of one or more molds to move outwardly, and as the mold carrier moves outwardly, pulling at least one piston rod operatively coupled to the mold carrier outward from a fluid cylinder, and dragging the cylinder outwardly in the same direction in which the mold carrier moves. The method includes further determining when the mold carrier has reached a predetermined position, and when it is determined that the mold carrier has reached that predetermined position, pressurizing the cylinder to push the at least one piston rod further outward to apply clamping pressure to the mold carrier to force the mold carrier into a closed position.

BRIEF DESCRIPTION OF THE DRAWINGS

The disclosure, together with additional objects, features, advantages and aspects thereof, will be best understood from the following description, the appended claims, and the accompanying drawings, in which:

DETAILED DESCRIPTION

Figure 1:
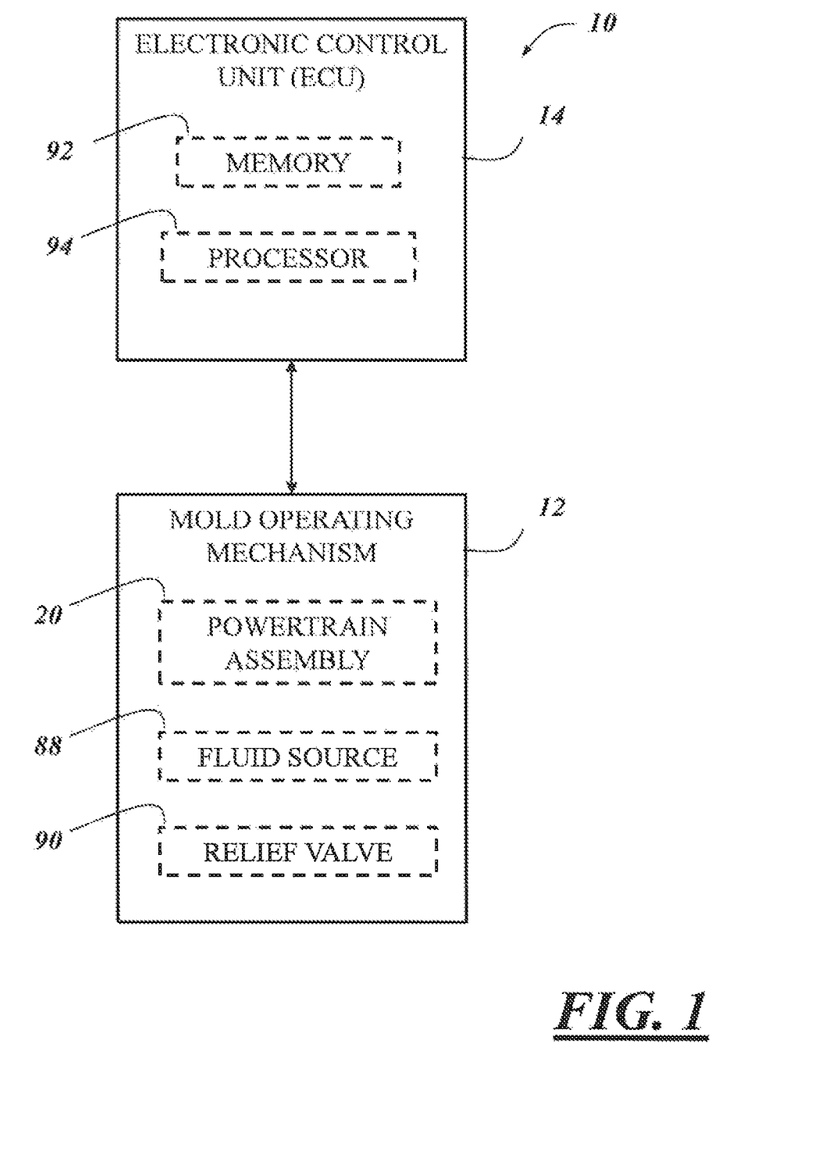
FIG. 1 is a block diagram and schematic view of an illustrative embodiment of a system for use with a glassware forming machine in accordance with the present disclosure.

FIG. 1 depicts a block diagram of an embodiment of a system 10 for use with a glassware forming machine. The system 10 includes, among other components, one or more motor-driven mold operating mechanisms 12 configured and operable to open or close molds or blanks of the glassware forming machine, and an electronic control unit 14 configured and operable to control the operation of one or more components of the mold operating mechanism(s) 12. The system 10 may be used to form glassware in a glass-forming process. The glassware may include, for example, bottles, jars, jugs, growlers, or another suitable container. More particularly, the system 10 may be used to carry an article of glassware through one or more steps of a glassware forming process from, for example, blank molding of a parison to releasing a fully-formed container on a dead plate or on any other suitable ware handler at a downstream end of the forming process.

In an embodiment, the system 10 may include a single mold operating mechanism 12, while in other embodiments, the system 10 may include a plurality of such mechanisms. For example, in an embodiment, the system 10 may include a pair of opposed operating mechanisms 12 that operate or work together to open and close molds or blanks of the glassware forming machine that open away from one another and close toward one another. For example, in an embodiment, the molds or blanks of the machine may open away from one another along a linear path and close toward one another along the same linear path. In other embodiments, the molds or blanks may open and close along a non-linear path, for example, an arcuate path (e.g., the molds or blanks pivot or articulate between open and closed positions) or another suitable non-linear path. Whether the system 10 includes one or multiple mold operating mechanisms 12, in the embodiment illustrated in, for example, FIGS. 2 and 3, each mold operating mechanism 12 includes a base frame 16, a mold manifold or carrier 18, a powertrain assembly 20, a drivetrain assembly 22 (best shown in FIG. 5), and a fluid cylinder 24.

Figure 2:
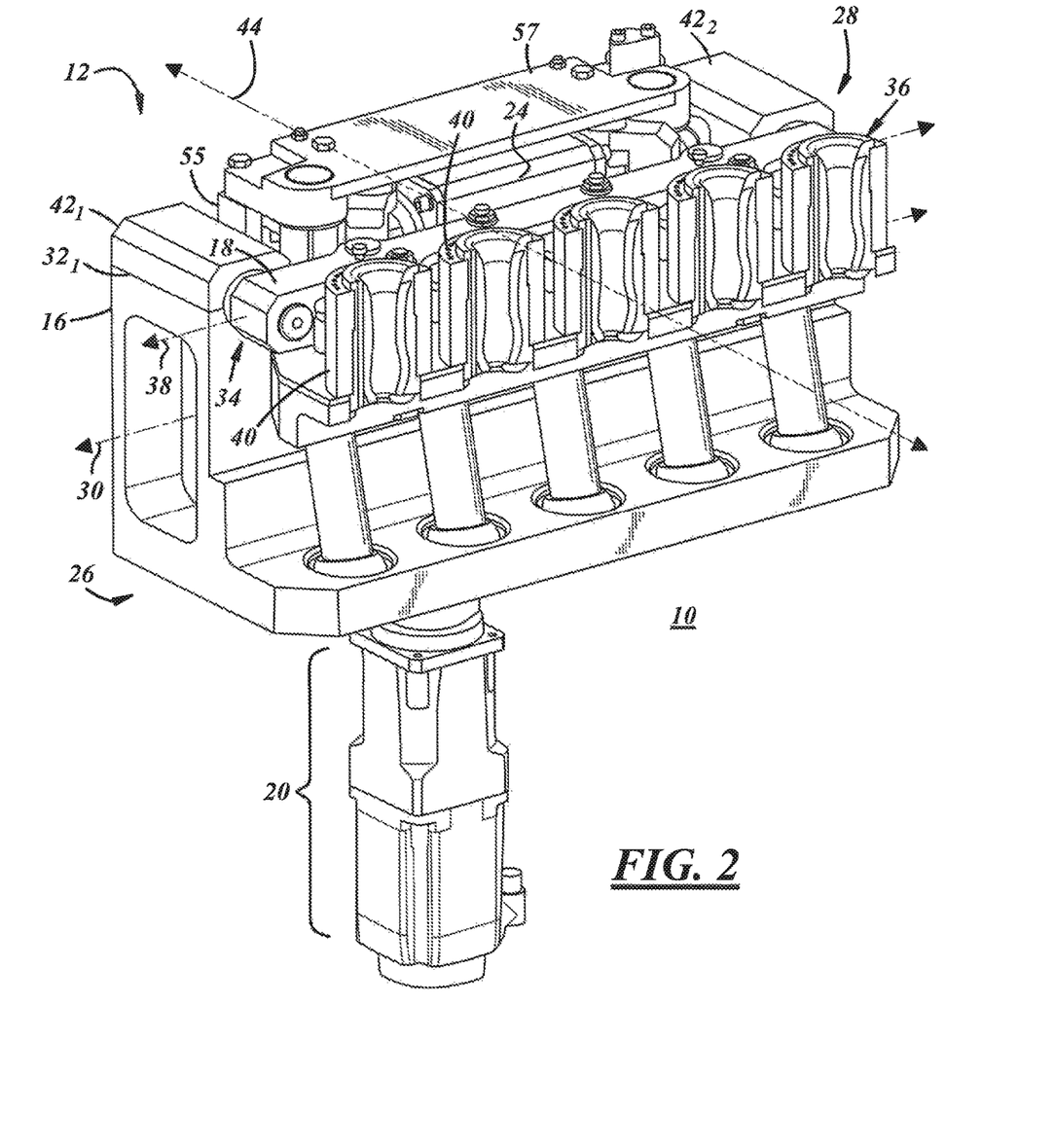
FIG. 2 is a front perspective view of an illustrative embodiment of a mold operating mechanism of the system illustrated in FIG. 1.
Figure 3:
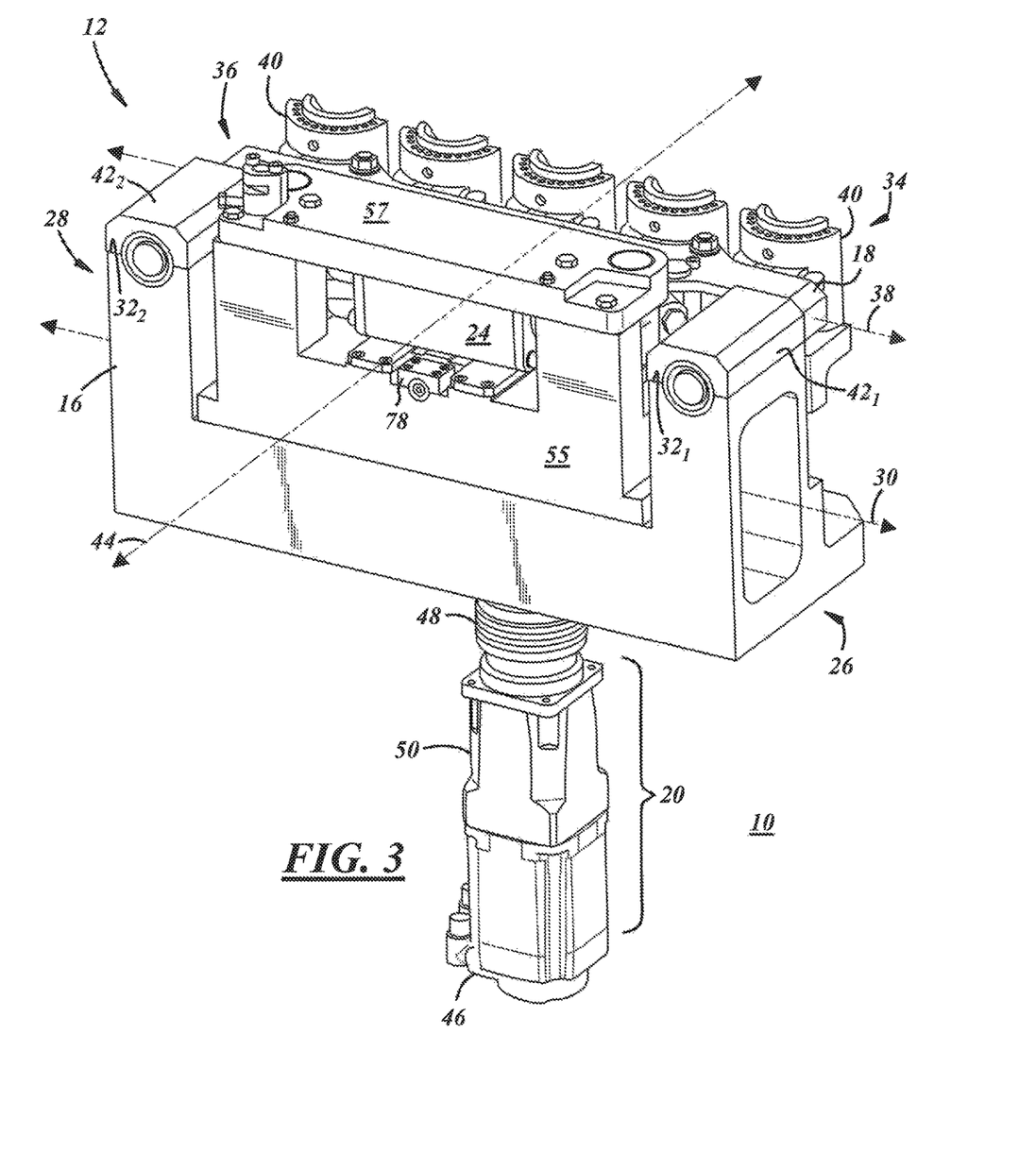
FIG. 3 is a back perspective view of the mold operating mechanism illustrated in FIG. 2.

As illustrated in FIGS. 2 and 3, the base frame 16 has a first end 26, a second end 28, and a longitudinal axis 30 extending between and through the first and second ends 26, 28, and is configured and adapted to allow other components of the operating mechanism 12 to be mounted thereon. In an embodiment, the base frame 16 includes one or more shoulders 32 upon which one or more other components of the operating mechanism 12 may be mounted. For example, in the embodiment illustrated in FIGS. 2 and 3, the base frame 16 includes a pair of laterally-spaced shoulders $32_1$, $32_2$ each configured to allow another component of the operating mechanism 12 to be mounted thereon. In the illustrated embodiment, one of the shoulders $32_1$, $32_2$ is disposed or located at the first end 26 of the base frame 16, while the other shoulder $32_1$, $32_2$ is disposed or located at the second end 28. In other embodiments, rather than the shoulders $32_1$, $32_2$ being disposed at the outermost ends 26, 28 of the base frame 16, one or both may be disposed at a location on the base frame 16 between the first and second ends 26, 28.

With continued reference to FIGS. 2 and 3, in an embodiment, the mold carrier 18 of the operating mechanism 12 has a first end 34, a second end 36, and a longitudinal axis 38 extending between and through the first and second ends 34, 36 that, in the illustrated embodiment, is parallel to the axis 30 of the base frame 16. The mold carrier 18 carries at least a portion of one or more molds or blanks 40 of the glassware forming machine and is slidably coupled to the base frame 16. More particularly, in an embodiment, the mold carrier 18 carries at a least a portion of each of a plurality of axially-spaced molds 40, and may be slidably coupled to the base frame 16 via one or more guide blocks 42 and corresponding bearings mounted to and carried by the base frame 16. In the illustrated embodiment, the operating mechanism 12 includes a pair of guide blocks $42_1$, $42_2$, each of which is mounted to the base frame 16, and a corresponding shoulder 32 thereof, in particular, and each of which is configured to slidably mount the mold carrier 18 to the base frame 16. More specifically, each of the guide blocks 42 and corresponding bearings allow for the mold carrier 18 to move or translate outwardly and inwardly relative to the base frame 16 along an axis 44 that is perpendicular or transverse to the longitudinal axes 30, 38 of the base frame 16 and mold carrier 18, respectively (i.e., the outward movement being away from the base frame 16 and the inward movement being towards the base frame 16).

In general terms, the powertrain assembly 20 of the operating mechanism 12 is configured and operable to drive the movement of the mold carrier 18 to open and close the molds 40, and to apply or supply clamping pressure when the operating mechanism 12, and the mold carrier 18 thereof, in particular, is in a closed position (i.e., when the molds 40 are closed). As best illustrated FIGS. 3 and 4, in an embodiment, the powertrain assembly 20 includes a motor 46 (e.g., a servo motor). The motor 46 is configured and operable to drive the movement of the mold carrier 18 and to supply clamping pressure when the mold carrier 18 is in the closed position. The powertrain assembly 20 may include further a drivetrain coupling 48 operatively coupled to the output of the motor 46 and, as will be described below, the drivetrain assembly 22 of the operating mechanism 12. The powertrain assembly 20 may include still further a gearbox 50 operatively coupled to the motor 46. In an embodiment wherein the powertrain assembly 20 includes the drivetrain coupling 48, the gearbox 50 may be operatively coupled between the motor 46 and the drivetrain coupling 48. As will be described in greater detail below, the powertrain assembly 20 is configured and operable to drive the drivetrain assembly 22 and to provide or supply clamping pressure to the mold carrier 18 when it is in the closed position. More specifically, the motor 46 or, in another embodiment, the combination of the motor 46 and gearbox 50 (and/or the drivetrain coupling 48, if applicable), is configured and operable to drive the rotation of one or more components of the drivetrain assembly 22 that is/are operatively coupled to the powertrain assembly 20 (e.g., the drivetrain coupling 48). It will be understood that as used herein, the phrase "operatively coupled" is intended to encompass both the direct coupling of one component to another (e.g., the direct coupling of the output of the motor 46 to a component of the drivetrain assembly 22 or the drivetrain coupling 48), as well as the indirect coupling of one component to another via one or more intermediate components (e.g., the indirect coupling of the output of the motor 46 to a component of the drivetrain assembly 22 or the drivetrain coupling 48 via or through the drivetrain coupling 48 and/or the gearbox 50). Accordingly, two components that are "operatively coupled" together may be either directly or indirectly coupled.

For purposes of illustration and clarity only, the description below will be with respect to an embodiment wherein the powertrain assembly 20 includes the drivetrain coupling 48. It will be appreciated in view of the foregoing, however, that the present disclosure is not intended to be limited to such an embodiment, but rather embodiments wherein the powertrain assembly 20 does not include a drivetrain coupling 48 (e.g., embodiments wherein the motor 46 is directly coupled to a component of the drivetrain assembly 22 or coupled thereto through a component other than the drivetrain coupling 48) remain within the spirit and scope of the disclosure.

Figure 4:
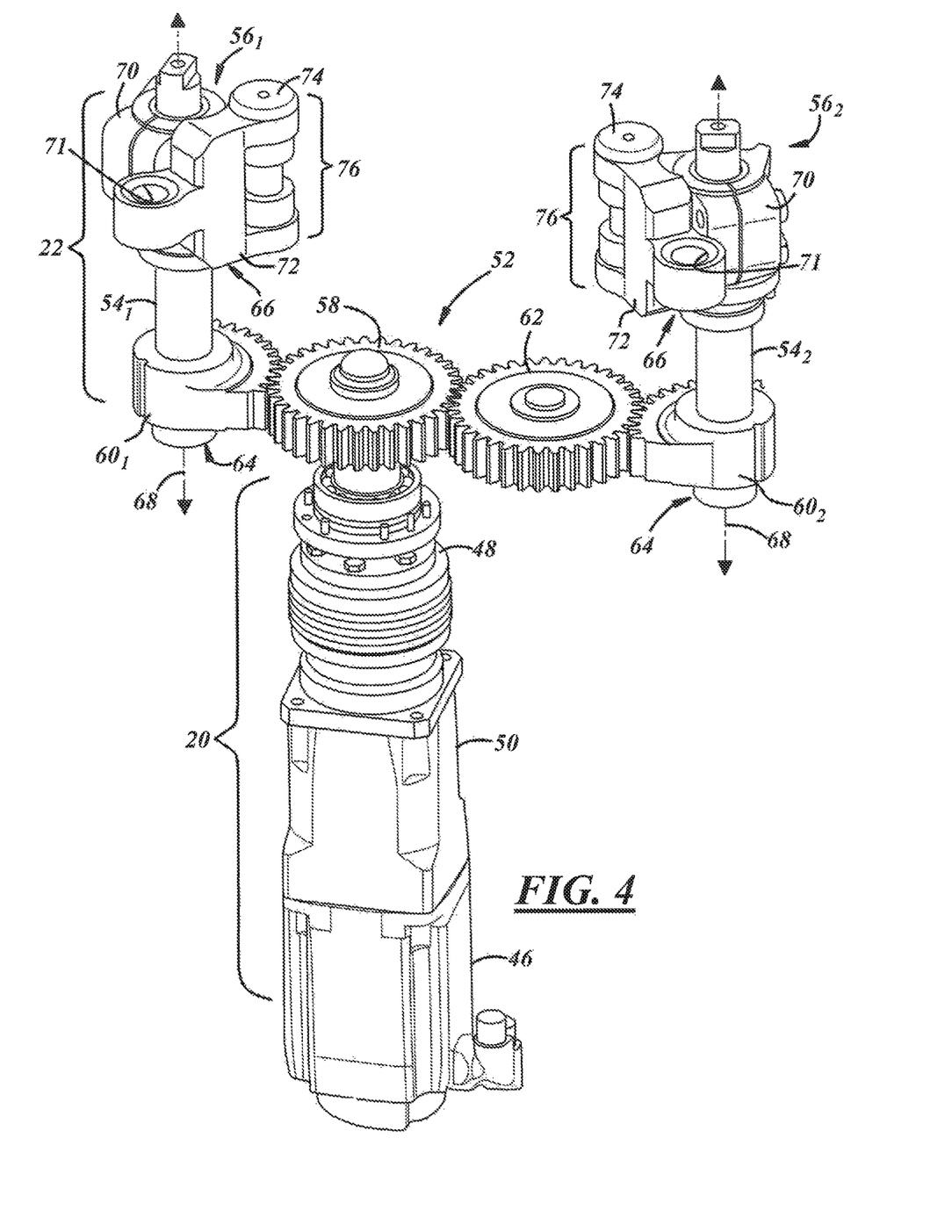
FIG. 4 is a perspective view of an illustrative embodiment of a drivetrain assembly of the mold operating mechanism illustrated in FIGS. 2 and 3.

Turning now to the drivetrain assembly 22, the drivetrain assembly 22 is carried by the base frame 16, and, in the embodiment illustrated in FIGS. 2 and 3, carried between the guide blocks $42_1$, $42_2$ mounted on the base frame 16, in particular. Accordingly, in an embodiment wherein the guide blocks $42_1$, $42_2$ are mounted on the shoulders $32_1$, $32_2$ of the base frame 16, the drivetrain assembly 22 may be carried between the shoulders $32_1$, $32_2$. With reference to FIG. 4, the drivetrain assembly 22 may include a gearset 52, one or more operating shafts 54 operatively coupled to the gearset 52, and one or more linkages 56 (i.e., linkages $56_1$, $56_2$ described below) operatively coupled to one or more corresponding operating shafts 54 and the mold carrier 18. In the embodiment illustrated in FIG. 3, the drivetrain assembly 22 may include further a sub-frame 55 carried by the base frame 16 of the operating mechanism 12 and adapted to carry one or more other components of the drivetrain assembly 22 (e.g., the gearset 52 and operating shaft(s) 54). In other embodiments, however, the drivetrain assembly 22 may not include a sub-frame, but rather one or more of the components of the drivetrain assembly 22 may be carried by the base frame 16 or another component of the system 10. Additionally, in an embodiment, the drivetrain assembly 22 may include still further a support plate 57 coupled to the base frame 16 or, as illustrated in FIG. 3, the sub-frame 55, to further support and carry one or more components of the drivetrain assembly 22 (e.g., the operating shaft(s) 54). In other embodiments, however, a support plate is not included.

In any event, as illustrated in FIG. 4, the gearset 52 of the drivetrain assembly 22 is operatively coupled to, and configured to be driven by, the powertrain assembly 20. More particularly, in the illustrated embodiment, the gearset 52 is coupled to the drivetrain coupling 48 of the powertrain assembly 20, which, as briefly described above, operatively couples the powertrain assembly 20 to the drivetrain assembly 22. The gearset 52 may comprise one or a plurality of individual gears. For example, in the embodiment illustrated in FIG. 4, the gearset 52 comprises four gears—a drive gear 58, a first driven gear $60_1$, a second driven gear $60_2$, and an idler gear 62. In an embodiment, both the drive gear 58 and the idler gear 62 comprise spur gears, while the driven gears $60_1$, $60_2$ comprise sector gears, though the present disclosure is not limited to any particular types of gears. As depicted in FIG. 4, the drive gear 58 is coupled to the drivetrain coupling 48 of the powertrain assembly 20, and thus, is driven by the powertrain assembly 20. More particularly, in an embodiment, the drive gear 58 is mounted on the drivetrain coupling 48 such that the axes of rotation of the coupling 48 and drive gear 58 are coaxial.

The drive gear 58 is configured and operable to drive the driven gears $60_1$, $60_2$ and the idler gear 62 of the gearset 52. More specifically, in the illustrated embodiment, the drive gear 58 is engaged with both the first driven gear $60_1$ and the idler gear 62, and the teeth of the engaged gears are meshed with one another. The idler gear 62 is also engaged with the second driven gear $60_2$, and the teeth of those gears are meshed with one another. Accordingly, and as will be described in greater detail below, as the drive gear 58 is driven and rotated by the powertrain assembly 20, the other gears of the gearset 52 also rotate by virtue of their direct or indirect engagement with the drive gear 58.

While in the embodiment described above, the gearset 52 has four gears (i.e., a drive gear, an idler gear, and a pair of driven gears), the actual number of gears that the gearset 52 includes may be dependent, at least in part, on the particular arrangement and composition of the drivetrain assembly 22. For example, the number of driven gears 60 required may be dependent upon the number of operating shafts 54 and/or linkages 56 that the drivetrain assembly 22 includes (e.g., one driven gear 60 for each operating shaft 54 and/or linkage 56). Accordingly, it will be appreciated that the gearset 52 may include more or fewer gears than that described above, and therefore, the present disclosure is not limited to any particular gearset composition or arrangement.

The drivetrain assembly 22 includes further one or more operating shafts 54 (i.e., operating shafts $54_1$, $54_2$ described below) operatively coupled to and between the gearset 52 and the linkage(s) 56 of the assembly 22. Each operating shaft 54 has a first (e.g., bottom) end 64, a second (e.g., top) end 66, and a longitudinal axis 68 extending between and through the first and second ends 64, 66. In an illustrative embodiment, the first end 64 of each operating shaft 54 is operatively coupled to a corresponding driven gear 60 of the gearset 52, and, as will be described in greater detail below, the second end 66 is operatively coupled to a corresponding linkage 56 of the drivetrain assembly 22; though, in other embodiments, this arrangement may be reversed.

The operating shaft(s) 54 and the driven gear(s) 60 may be operatively coupled together in a number of suitable ways. For example, in an embodiment, each driven gear 60 may include an aperture sized and shaped to receive and hold therein a portion of a corresponding operating shaft 54 (e.g., the first end 64 of the operating shaft 54). Accordingly, in the embodiment illustrated in FIG. 4 wherein the drivetrain assembly 22 includes a pair of operating shafts 54 (i.e., a first operating shaft $54_1$ and a second operating shaft $54_2$), each of driven gears $60_1$, $60_2$ includes an aperture sized and shaped to receive and hold a portion of a corresponding one of the operating shafts $54_1$, $54_2$ to operatively couple the operating shafts $54_1$, $54_2$ with the gearset 52. More particularly, the driven gear $60_1$ includes an aperture within which the first operating shaft held to operatively couple the operating shaft $54_1$ to the gearset 52, and the driven gear $60_2$ includes an aperture within which the second operating shaft $54_2$ is held to operatively couple the operating shaft $54_2$ to the gearset 52. In any event, and as will be described in greater detail below, by virtue of the operative coupling of the operating shaft(s) 54 to the gearset 52, as the gearset 52 is driven by the powertrain assembly 20, the operating shafts 54 are, in turn, driven or rotated by the gearset 52.

Similar to the number of gears in the gearset 52, the number of operating shafts 54 required may be dependent, at least in part, on the number of driven gears 60 of the gearset 52 and/or linkages 56 that the drivetrain assembly 22 includes (e.g., one operating shaft 54 for each driven gear 60 and/or linkage 56). Accordingly, it will be appreciated that the present disclosure is not limited to any particular number of operating shafts 54.

Figure 5:
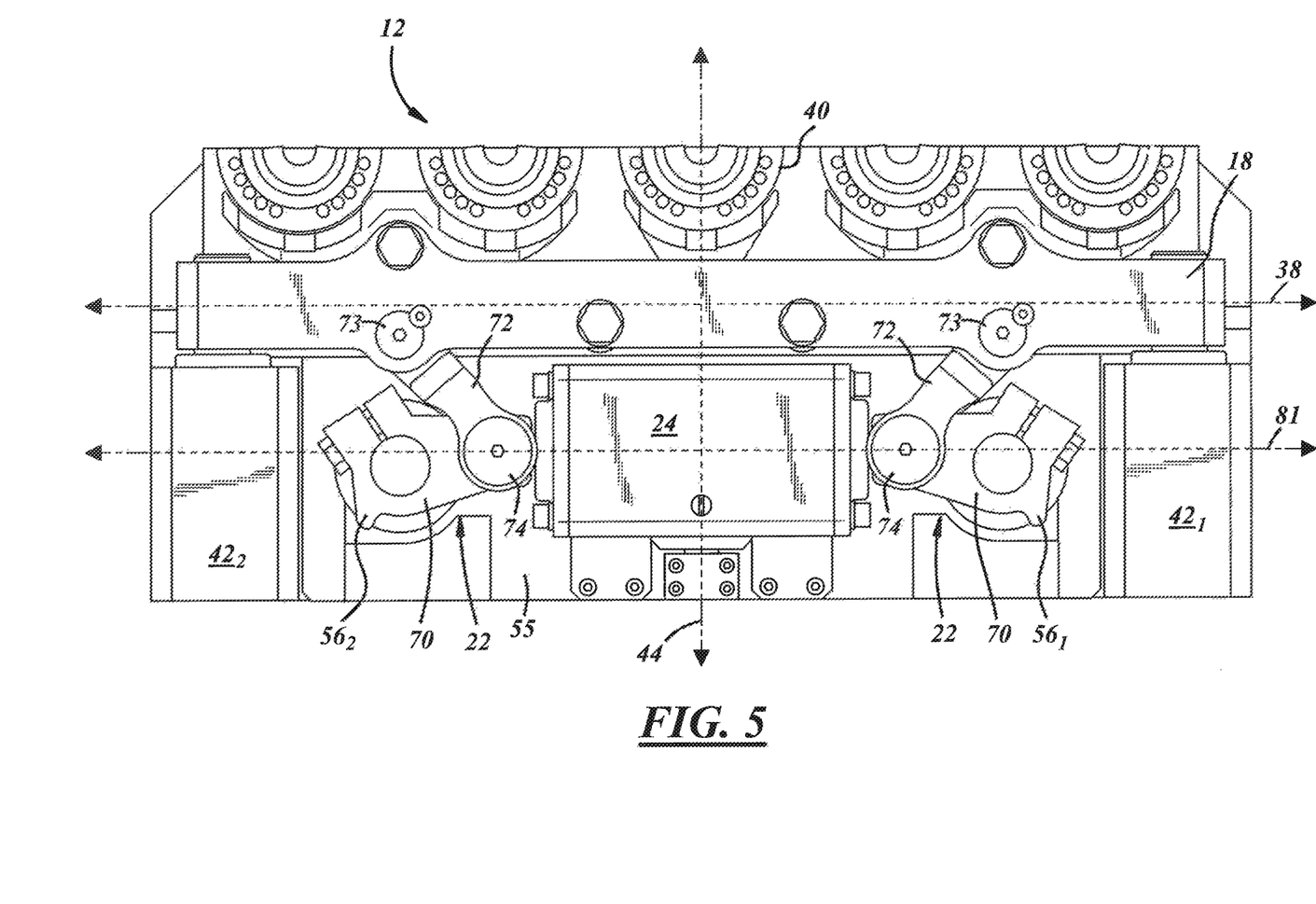
FIG. 5 is top plan view of a portion of the mold operating mechanism illustrated in FIGS. 2 and 3 wherein the mold carrier of the mechanism is in an open position.
Figure 6:
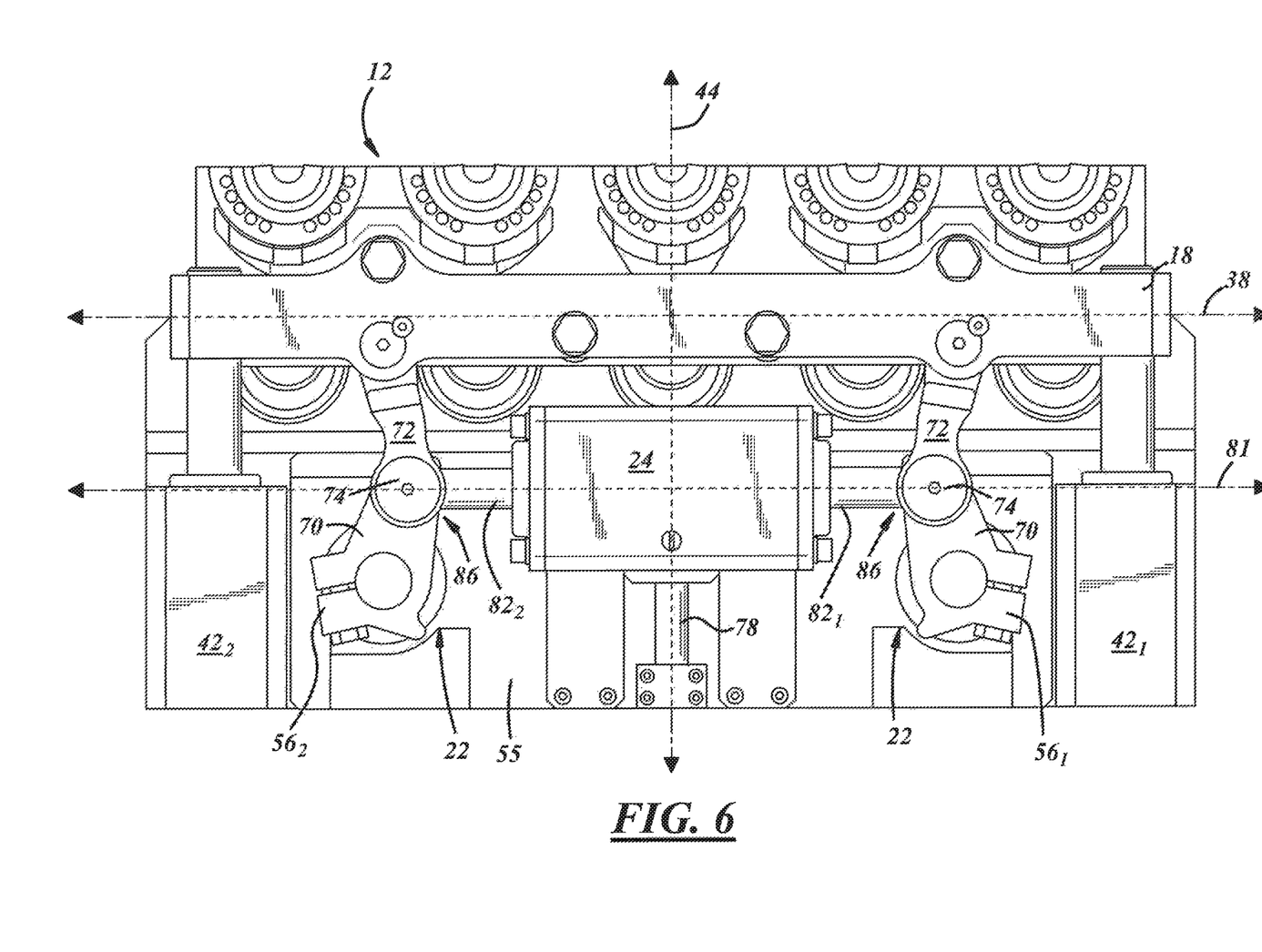
FIG. 6 is another top plan view of a portion of the mold operating mechanism illustrated in FIGS. 2 and 3 wherein the mold carrier of the mechanism is in a closed position.

As briefly described above, the drivetrain assembly 22 includes further one or more linkages 56. Each linkage 56 is operatively coupled to and between a corresponding operating shaft 54 and the mold carrier 18 of the operating mechanism 12, and is configured and operable to translate or transfer the rotation of the operating shaft(s) 54 into movement of the mold carrier 18. Accordingly, in the illustrative embodiment depicted in FIGS. 3 and 4, the linkages 56 are configured and operable to translate or transfer the rotation of the operating shafts 54 into linear movement of the mold carrier 18 along the axis 44. In the embodiment illustrated in FIG. 4, the drivetrain assembly 22 includes a first linkage $56_1$ and a second linkage $56_2$, with the first linkage $56_1$ being operatively coupled to the first operating shaft $54_1$ and the second linkage $56_2$ being operatively coupled to the second operating shaft $54_2$. As illustrated in FIGS. 4-6, each of linkages $56_1$, $56_2$ includes a first lever arm 70 and a second lever arm 72. In an embodiment, the first lever arms 70 are operatively coupled to the corresponding operating shafts $54_1$, $54_2$, and the second lever arms 72 are operatively coupled, and, in an embodiment, pivotally coupled, to the mold carrier 18.

The first and second lever arms 70, 72 may be operatively coupled to the operating shafts 54 and mold carrier 18, respectively, in any number of suitable ways. For example, in an embodiment, the first lever arms 70 may each include an aperture sized and shaped to receive and hold therein a portion of the corresponding operating shaft 54 (e.g., the second end 66 of the operating shaft 54). Accordingly, in the embodiment illustrated in FIG. 4, the lever arm 70 of the linkage $56_1$ includes an aperture within which a portion of the first operating shaft $54_1$ is held to operatively couple the operating shaft $54_1$ to the linkage $56_1$, and the lever arm 70 of the linkage $56_2$ includes an aperture within which a portion of the second operating shaft $54_2$ is held to operatively couple the operating shaft $54_2$ to the linkage $56_2$.

With respect to the coupling of the second lever arm 72 of each linkage 56 and the mold carrier 18, in the embodiment illustrated in FIGS. 5 and 6, each lever arm 72 may include an aperture 71 (best shown in FIG. 4) that may be aligned with a corresponding aperture in the mold carrier 18, and then a pin, rod, or another suitable mechanical fastener 73 may be inserted into and through the apertures 71 in the lever arm 72 and mold carrier 18 to operatively couple the lever arm 72 to the mold carrier 18. Accordingly, in the embodiment illustrated in FIG. 4, an aperture 71 in the lever arm 72 of each linkage $56_1$, $56_2$ is aligned with corresponding apertures in the mold carrier 18, and then a pin, rod, or other suitable mechanical fastener 73 is inserted into and through the apertures to couple the second lever arms 72, and therefore the linkages $56_1$, $56_2$, to the mold carrier 18. In an embodiment wherein the lever arm 72 of each linkage 56 is pivotally coupled to the mold carrier 18, needle bearings may also be used to further facilitate the rotation/pivoting of the second lever arm 72 relative to the mold carrier 18.

In addition to being coupled to the mold carrier 18, the second lever arm 72 of each linkage 56 is also coupled to the first lever arm 70 of that linkage 56, and, in an embodiment, is pivotally coupled to the first lever arm 70. The first and second lever arms 70, 72 may be coupled in any number of suitable ways. For example, in the embodiment illustrated in FIG. 4, apertures in the first and second lever arms 70, 72 are aligned with one another and a pin, rod, or other suitable mechanical fastener 74 is inserted therein to form a center joint or knuckle 76 that enables or facilitates the rotation or pivoting of the second lever arm 72 about the axis of the pin 74—which, incidentally, is parallel to the longitudinal axis 68 of the operating shaft 54 to which the linkage 56 is coupled. In an embodiment, the center joint or knuckle 76 may also include needle bearings to further facilitate the rotation/pivoting of the second lever arm 72.

In any event, and as will be described in greater detail below, by virtue of the operative coupling of the linkage(s) 56 to both the operating shaft(s) 54 and the mold carrier 18, as the operating shaft(s) 54 is/are driven or rotated by the gearset 52, the linkage(s) 56 are, in turn, driven or rotated by the operating shaft(s) 54, thereby causing, in the illustrated embodiment, the mold carrier 18 to be pushed or pulled, depending on the direction of the rotation, along the axis 44.

While the embodiment illustrated in, for example, FIG. 4 includes a pair of linkages 56, the actual number of linkages required may be dependent, at least in part, on the number of driven gears 60 of the gearset 52 and/or operating shafts 54 that the drivetrain assembly 22 includes (e.g., one linkage 56 for each driven gear 60 and/or operating shaft 54). Accordingly, it will be appreciated that the present disclosure is not limited to any particular number of linkages 56.

Figure 7:
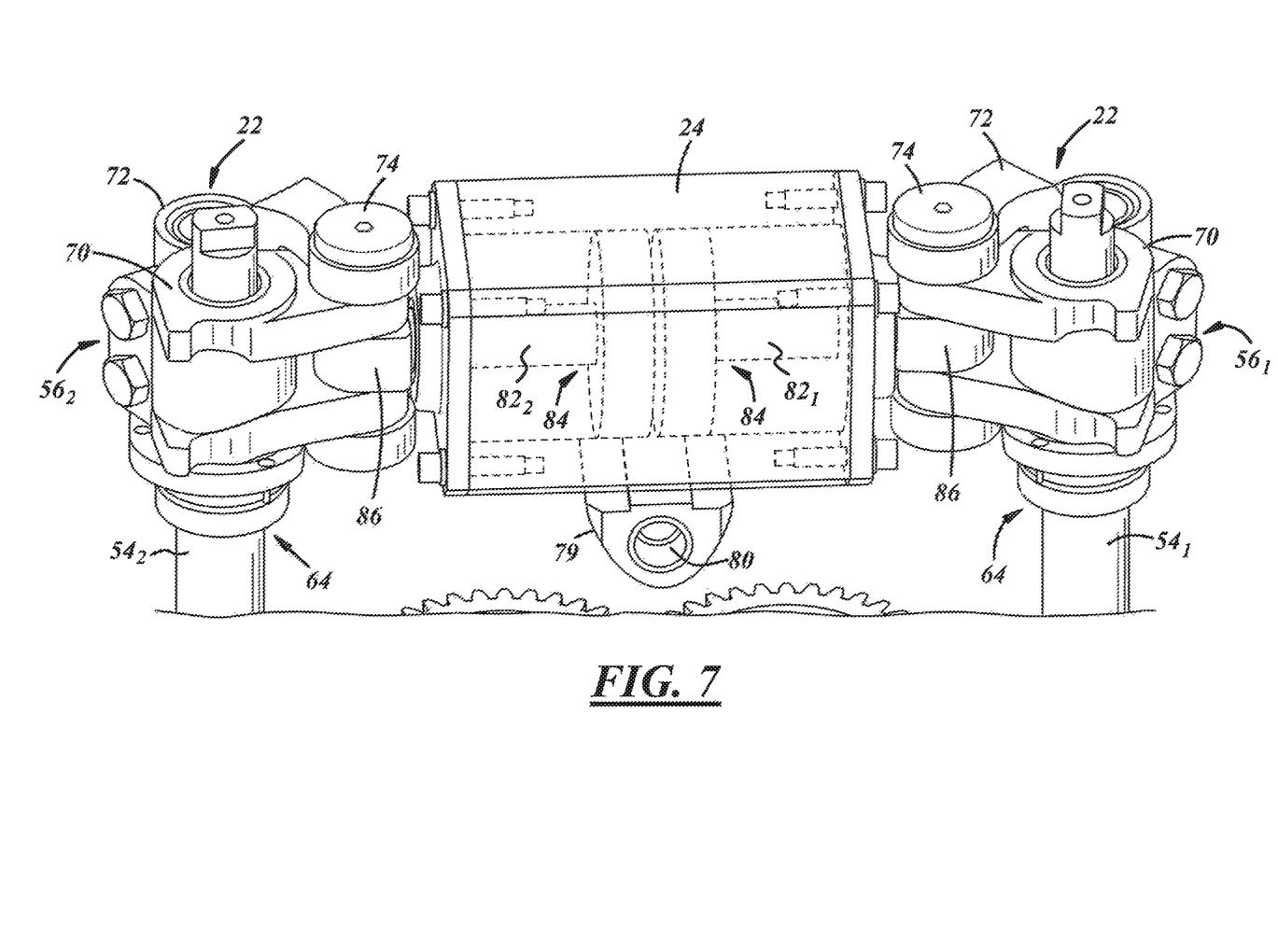
FIG. 7 is a perspective view of a portion of the drivetrain assembly illustrated in FIG. 4 and a fluid cylinder of the mold operating mechanism illustrated in FIGS. 2 and 3.

With particular reference to FIGS. 5-7, in addition to the components described above, the illustrated embodiment of the operating mechanism 12 includes further the fluid cylinder 24. The cylinder 24 may be slidably mounted to the base frame 16 of the operating mechanism 12 or, if applicable and as illustrated in FIGS. 5 and 6 (as well as FIG. 3), the sub-frame 55 of the drivetrain assembly 22, and is mounted proximate the linkage(s) 56 of the drivetrain assembly 22. Further, in the embodiment illustrated in FIGS. 5-7 wherein the drivetrain assembly 22 includes two linkages $56_1$, $56_2$, the cylinder 24 may be mounted between the linkages $56_1$, $56_2$. The cylinder 24 may be slidably mounted using any number of suitable techniques. In the illustrated embodiment, the cylinder 24 may be slidably mounted via a guide rod 78 mounted to or on, and carried by, the base frame 16 or sub-frame 55. More particularly, and as best shown in FIG. 7, a coupling 79 carried by the cylinder 24 is configured to slidably mount the cylinder 24 to the guide rod 78. In an illustrative embodiment, the coupling 79 may be carried by the underside or bottom of the cylinder 24, and may include a slot or through bore 80 extending transversely relative to the axis 44 along which the cylinder 24 travels. The bore 80 is sized and shaped to receive the guide rod 78 and to allow the coupling 79, and therefore, the cylinder 24, to travel or translate along the guide rod 78. In any event, the cylinder 24 is able to be moved back and forth along the same path or axis that the mold carrier 18 travels (i.e., axis 44). In an embodiment, the guide rod 78 may also be configured to supply fluid (e.g., air) to the cylinder 24, and as such, may be fluidly coupled to and between a fluid source and the cylinder 24.

While in the embodiment described above, the cylinder 24 is slidably mounted to or on the base frame 16 or sub-frame 55 via the guide rod 78, it will be appreciated that in other embodiments, the cylinder 24 may be slidably mounted using other techniques, or may be arranged to simply move along the base frame 16 or sub-frame 55 (or another component of the operating mechanism 12) without being slidably mounted to any particular guide. Accordingly, the present disclosure is not limited to any particular arrangement for facilitating the movement of the cylinder 24.

In addition to the above, the cylinder 24 has a longitudinal axis 81 that is parallel to the respective longitudinal axes 30, 38 of the base frame 16 and mold carrier 18, and that is perpendicular or transverse to the axis 44 along which the cylinder 24 and mold carrier 18 travels, and includes further one or more piston rods 82. Each piston rod 82 has a proximal end 84 (best shown in FIG. 7) disposed within the cylinder 24, and a distal end 86 (best shown in FIG. 6) disposed external to the cylinder 24. The distal end 86 of each piston rod 82 is coupled to a corresponding linkage 56 of the drivetrain assembly 22. Each piston rod 82 is configured and operable to be pulled outward from the cylinder 24 along the cylinder axis 81 as, for example, the linkage 56 to which it is coupled rotates or articulates in a first direction. Each piston rod 82 is also configured and operable to be pushed inward into the cylinder 24 along the axis 81 as the linkage 56 to which it is coupled rotates or articulates in a second, opposite direction. Accordingly, each of the piston rods 82 can be pushed and pulled into and out of the cylinder 24 in response to the rotation or articulation of the linkages 56 and dependent upon the direction of that rotation or articulation.

In the illustrated embodiment, the cylinder 24 comprises a pair of piston rods $82_1$, $82_2$, and therefore, comprises a dual piston rod fluid cylinder. In this embodiment, each piston rod $82_1$, $82_2$ is coupled to a respective one of the linkages $56_1$, $56_2$ (i.e., the piston rod $82_1$ is coupled to the linkage $56_1$, and the piston rod $82_2$ is coupled to the linkage $56_2$). It will be appreciated that while the description below will be primarily with respect to an embodiment wherein the cylinder 24 includes two piston rods 82, the present disclosure is not intended to be so limited. Rather, the number of piston rods 82 that the cylinder 24 has may be dependent, at least in part, on the number of linkages 56 that the drivetrain assembly 22 includes (e.g., one piston rod 82 for each linkage 56). Accordingly, it will be appreciated that the present disclosure is not limited to any particular number of piston rods 82.

The piston rods $82_1$, $82_2$ of the cylinder 24 may be coupled to the linkages $56_1$, $56_2$ in any number of suitable ways. For example, in the embodiment illustrated in FIGS. 5-7, the piston rods $82t$, $82_2$ may be coupled to the center joint or knuckles 76 of the respectively linkage $56_1$, $56_2$. In such an embodiment, each of the piston rods $82_1$, $82_2$ may include an aperture at the distal end 86 thereof that may be aligned with the apertures of the first and second lever arms 70, 72 of the linkage 56 to which the piston rod is to be coupled. Once aligned, the pin 74 may be inserted through the apertures to hold the lever arms 70, 72 and piston rod 82 together. It will be appreciated that while one particular way of coupling a piston rod to a linkage has been described, any number of other suitable techniques may be used, and therefore, the present disclosure is not limited to any particular coupling technique(s).

In addition to the above, in an embodiment, the cylinder 24 may be selectively pressurized to cause the piston rod(s) 82 thereof to be pushed outward from the cylinder 24, and then subsequently de-pressurized to allow the piston rod(s) 82 to be pushed back into the cylinder 24. In an embodiment, the operating mechanism 12 may include a fluid source or supply 88 (shown diagrammatically in FIG. 1) that is configured and operable to selectively supply fluid, for example, air, gas, hydraulic fluid or oil, or any other suitable fluid, to the cylinder 24 to thereby pressurize the cylinder 24. More particularly, in an embodiment, the ECU 14 of system 10 may be configured to control the operation of the fluid source to selectively supply fluid to the cylinder 24. In any event, the cylinder 24 may include an inlet port to which an outlet port of the fluid source may be fluidly coupled to supply fluid to the cylinder 24. The cylinder 24 may include further a release or relief valve 90 (shown diagrammatically in FIG. 1) that allows for the fluid pressure in the cylinder 24 to be relieved to atmosphere. In an embodiment, the release or relief valve 90 may be an electrically controlled valve, a pneumatically controlled valve, or any other suitable valve. In an embodiment, the opening and closing of the valve may be controlled by the ECU 14 of the operating mechanism 12; though the present disclosure is not limited to such an embodiment.

Turning now to the ECU 14 of the system, the ECU 14 may include or comprise any variety of electronic processing devices, memory devices, input/output (I/O) devices, and/or other known components, and may perform various control and/or communication related functions. In an exemplary embodiment, the ECU 14 includes an electronic memory 92 that stores information utilized to, for example, control the operation of one or more components or functions of the mold operating mechanism 12. The ECU 14 may also include an electronic processor 94 (e.g., a microprocessor, a microcontroller, an application specific integrated circuit (ASIC), etc.) that executes instructions for software, firmware, programs, algorithms, scripts, etc. stored in the memory 92 and may govern and perform the processes and methods described herein. The ECU 14 may be electronically connected to other components of the system 10 (e.g., the powertrain assembly 20 and fluid source 88 of the operating mechanism 12, for example) via one or more wired or wireless connections across which that or those components and the ECU 14 may communicate and interact, as required. Additionally, depending on the particular embodiment, the ECU 14 may be a stand-alone unit or may be incorporated or included within another unit or module of the glassware forming machine. Accordingly, the ECU 14 is not limited to any one particular embodiment or arrangement.

As briefly described above, the ECU 14 may be configured to govern or control the operation of certain components of the operating mechanism 12. For example, the ECU 14 may be configured to control the powertrain assembly 20, and the operation of the motor 46 thereof in particular (e.g., the ECU 14 may be configured to control when the motor 46 is activated and deactivated, and the particular direction in which the motor output rotates). The ECU 14 may additionally or alternatively be configured to control the pressurization of the cylinder 24 by controlling the operation of one or both of the fluid source 88 of the operating mechanism 12 and the release or relief valve 90 of the cylinder 24. Accordingly, the ECU 14 may be configured to exert at least a measure of control over one or more components of the system 10 and operating mechanism 12 thereof, in particular, including, but not limited to, those identified above.

With particular reference to embodiment of the mold operating mechanism 12 illustrated FIGS. 1-7, and the example of a method 100 of actuating (i.e., closing and opening) a mold operating mechanism illustrated in FIGS. 8 and 9, the operation of the operating mechanism 12 will now be described.

Figure 8:
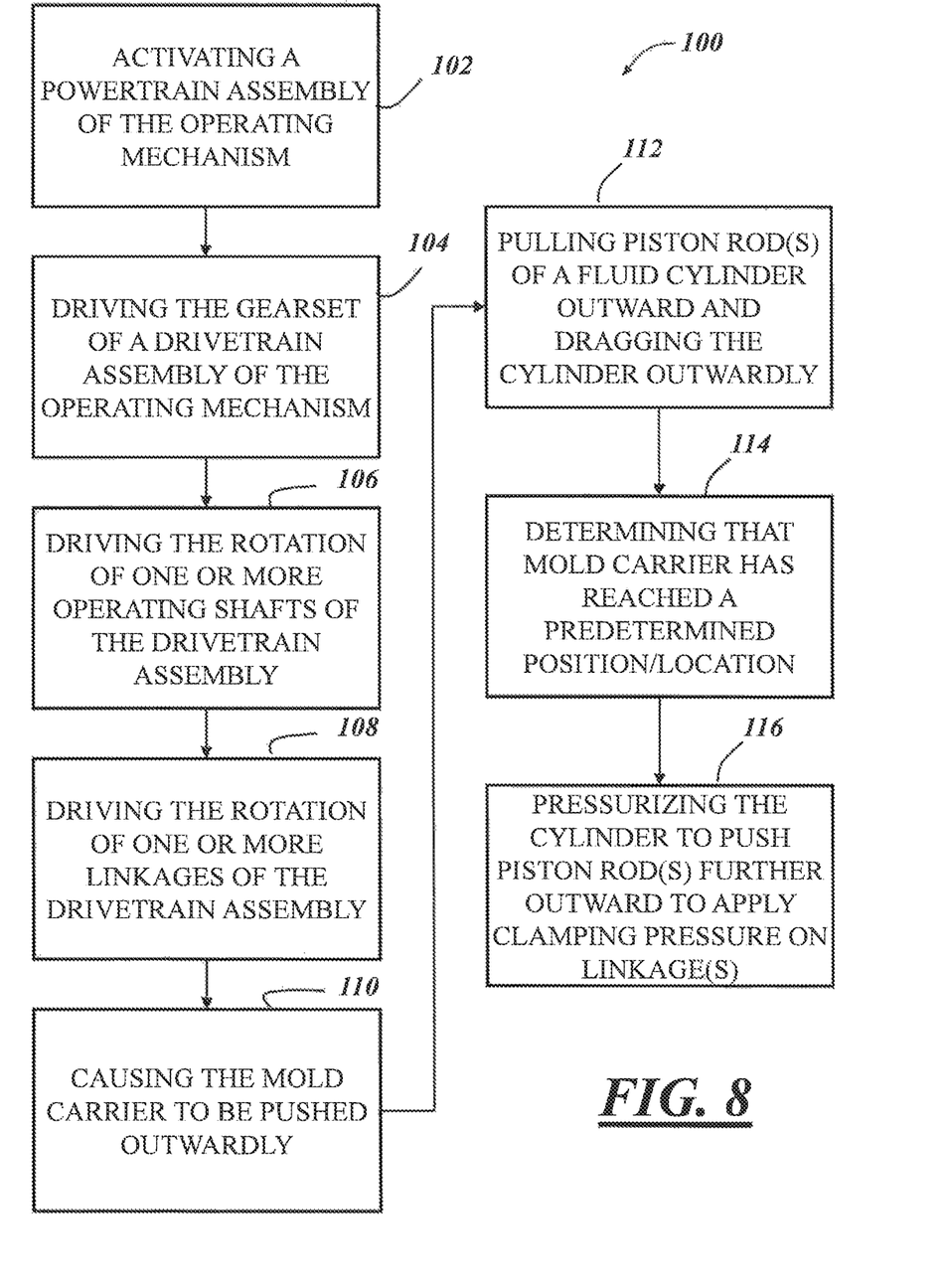
FIGS. 8 and 9 are flow diagrams illustrating an illustrative embodiment of a method of actuating a mold operating mechanism, for example, the mechanism illustrated in FIGS. 1-7.

Upon a determination that the mold carrier 18 has to be moved from an open position to a closed position or vice versa, the ECU 14 may activate the powertrain assembly 20, thereby causing the output of the motor 46 thereof to rotate (step 102 in FIG. 8). The particular direction of the rotation will depend on whether the mold carrier 18 is to be moved into an open or closed position, and the particular arrangement of the operating mechanism 12. Assuming that the mold carrier 18 is in the open position and is to be moved into the closed position, and that the operating mechanism 12 is arranged in the manner illustrated in FIGS. 1-7, the rotation of the motor output is in the counterclockwise direction.

As the motor output rotates, it drives the gearset 52 of the drivetrain assembly 22 (step 104 in FIG. 8). More particularly, as the motor output rotates in the counterclockwise direction, the drive gear 58 of the gearset 52 operatively coupled to the output of the motor 46 via the drivetrain coupling 48 also rotates in the counterclockwise direction. The rotation of the drive gear 58 directly drives the rotation of both the driven gear $60_1$ and the idler gear 62 in the clockwise direction. The rotation of the idler gear 62 in the clockwise direction drives the rotation of the second driven gear $60_2$ in the counterclockwise direction (i.e., which is opposite the direction of rotation of the first driven gear $60_1$).

As the first and second driven gears $60_1$, $60_2$ respectively rotate in the clockwise and counterclockwise directions, the operating shafts $54_1$, $54_2$ operatively coupled to the driven gears $60_1$, $60_2$, respectively, also respectively rotate in the clockwise and counterclockwise directions (step 106 in FIG. 8). The rotation of the operating shafts $54_1$, $54_2$ causes the rotation or articulation of the linkages $56_1$, $56_2$ respectively coupled to the operating shafts $54_1$, $54_2$ (step 108 in FIG. 8). Accordingly, the clockwise rotation of the operating shaft $54_1$ causes the clockwise rotation or articulation of the linkage $56_1$, and the first lever arm 70 thereof, in particular. Similarly, the counterclockwise rotation of the operating shaft $54_2$ causes the counterclockwise rotation or articulation of the linkage $56_2$, and the first lever arm 70 thereof, in particular. As illustrated in FIG. 6, as the linkages $56_1$, $56_2$ rotate or articulate, the lever arms 70, 72 thereof extend outwardly, with the second lever arm 72 of the linkage $56_1$ pivoting in a counterclockwise direction about center joint or knuckle 76 of the linkage $56_1$, and the second lever arm 72 of the linkage $56_2$ pivoting in a clockwise direction about the center joint or knuckle 76 of the linkage $56_2$. The rotation or articulation of the linkages $56_1$, $56_2$ and the extension of the lever arms 70, 72 thereof, causes the mold carrier 18 coupled to the second lever arms 72 to be pushed outwardly (i.e., away from the base frame 16) along the axis 44 (step 110 in FIG. 8). In addition, as the linkages $56_1$, $56_2$ rotate or articulate and the lever arms thereof extend, the piston rods $82_1$, $82_2$ respectively coupled to the linkages $56_1$, $56_2$ are pulled outward from the cylinder 24 along the axis 81, and the cylinder 24 is dragged outwardly along the axis 44 and the guide rod 78 (step 112 in FIG. 8).

After the mold carrier 18 has traveled or moved a predetermined distance and/or reached a predetermined position, the cylinder 24 is pressurized. Accordingly, in an embodiment, a determination is made as to whether the mold carrier 18 has reached a certain position (step 114 in FIG. 8) using any number of suitable techniques known in the art, and if so, then the cylinder 24 is pressurized (step 116 in FIG. 8). In an embodiment, the ECU 14 is configured to determine when the mold carrier 18 has reached the predetermined position and to then activate the fluid source 88 of the operating mechanism 12 to pressurize the cylinder 24.

More particularly, the mold carrier 18 may be moved to a predetermined position and stopped. This predetermined position may be an empirically-derived position that is stored, for example, in the electronic memory 92 of the ECU 14, and motor encoders associated with the motor 46 and/or displacement measurements of the mold carrier 18 can be used to determine when the mold carrier 18 has reached the predetermined position. In an embodiment where two operating mechanisms 12 operate together to open and close the molds 40, the mold carrier 18 of each operating mechanism 12 may be independently moved to a predetermined position and stopped as described above. In such an embodiment, when the two mold carriers 18 have reached the predetermined position(s), the motors 46 of the powertrain assemblies 20 of the respective operating mechanisms 12 may apply or supply clamping pressure to the mold carriers 18, and then the cylinders 24 of the operating mechanisms 12 may be pressurized. Alternatively, the mold carrier 18 of one of the two operating mechanisms 12 may be moved to a predetermined location in the manner described above, and the mold carrier 18 of the second operating mechanism 12 may be moved until it contacts the mold carrier 18 of the first operating mechanism 12, at which time it can be determined that the mold carriers 18 have both reached a predetermined position. The motors 46 of the operating mechanisms 12 may apply or supply clamping pressure to the mold carriers 18, and then the cylinders 24 of the operating mechanisms 12 may be pressurized.

In any event, and as described above, the pressurization of the cylinder 24 causes the piston rods $82_1$, $82_2$ to be pushed further outward from the cylinder 24, thereby resulting in the application of clamping pressure to the linkages $56_1$, $56_2$, and therefore, the mold carrier 18, in addition to any clamping pressure applied or supplied by the motor 46 to force the mold carrier 18 to the closed position. Once in the closed position, the mold(s) 40 carried on the mold carrier 18 may be used to form one or more parisons or to perform one or more other steps of the glassware forming process.

When it is determined that the mold(s) 40 should once again be opened, the mold carrier 18 may be moved from the closed position to the open position. In an embodiment, this may be accomplished by performing the methodology described above in the exact reverse order or at least substantially the reverse order.

Figure 9:
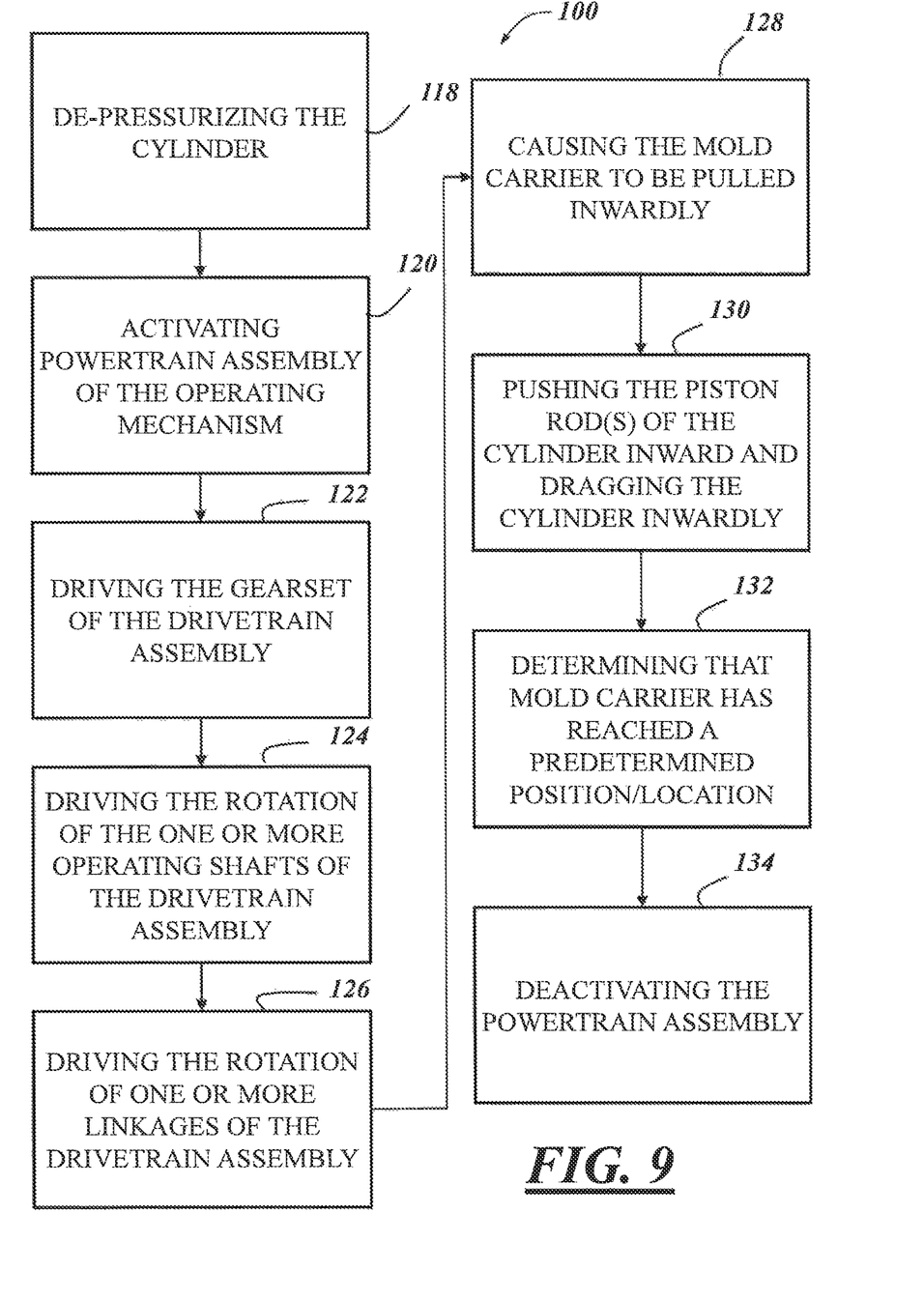

For example, and with reference FIG. 9, the cylinder 24 may first be de-pressurized (step 118 in FIG. 9) by opening, for example, one or more relief or release valves 90 of the cylinder 24. In an embodiment, the ECU 14 may be configured to cause the valve(s) 90 to open causing the fluid pressure in the cylinder to be relieved to atmosphere. The de-pressurization of the cylinder 24 may cause the piston rods $82_1$, $82_2$ to move inward relative to the cylinder 24 (i.e., the piston rods $82_1$, $82_2$ may move back into the cylinder 24), thereby releasing the clamping pressure applied to the linkages $56_1$, $56_2$ by the cylinder 24 Contemporaneous with, or subsequent to, the de-pressurization of the cylinder 24, the ECU 14 may activate the powertrain assembly 20 and the motor output may be rotated in the appropriate direction, which, in the embodiment of the operating mechanism 12 illustrated in FIGS. 1-7, is the clockwise direction (step 120 in FIG. 9). The rotation of the motor output first releases the clamping pressure applied or supplied to the mold carrier 18 by the powertrain assembly 20 (e.g., the motor 46), and then facilitates the opening of the molds 40, as will be described more fully below.

As the motor output rotates in the clockwise direction, it drives the gearset 52 of the drivetrain assembly 22 (step 122 in FIG. 9). More particularly, as the motor output rotates in the clockwise direction, the drive gear 58 of the gearset 52 operatively coupled to the motor output via the drivetrain coupling 48 also rotates in the clockwise direction. The rotation of the drive gear 58 drives the rotation of both the driven gear $60_1$ and the idler gear 62 in the counterclockwise direction; and the rotation of the idler gear 62 in the counterclockwise direction drives the rotation of the second driven gear $60_2$ in the clockwise direction (i.e., which is opposite the direction of rotation of the first driven gear $60_1$).

As the driven gears $60_1$, $60_2$ respectively rotate in the counterclockwise and clockwise directions, the operating shafts $54_1$, $54_2$ operatively coupled to the driven gears $60_1$, $60_2$, respectively, also respectively rotate in the counterclockwise and clockwise directions (step 124 in FIG. 9). The rotation of the operating shafts $54_1$, $54_2$ causes the rotation or articulation of the linkages $56_1$, $56_2$ respectively coupled to the operating shafts $54_1$, $54_2$ (step 126 in FIG. 9). Accordingly, the counterclockwise rotation of the operating shaft $54_1$ causes the counterclockwise rotation or articulation of the linkage $56_1$, and the first lever arm 70 thereof, in particular, and the clockwise rotation of the operating shaft $54_2$ causes the clockwise rotation or articulation of the linkage $56_2$, and the first lever arm 70 thereof, in particular. As illustrated in FIG. 5, as the linkages $56_1$, $56_2$ rotate, the lever arms 70, 72 thereof retract inwardly, with the second lever arm 72 of the linkage $56_1$ pivoting in a clockwise direction about center joint or knuckle 76 of the linkage $56_1$, and the second lever arm 72 of the linkage $56_2$ pivoting in a counterclockwise direction about the center joint or knuckle 76 of the linkage $56_2$. The rotation of the linkages $56_1$, $56_2$ and the retraction of the lever arms 70, 72 thereof causes the mold carrier 18 coupled to the second lever arms 72 to be pulled inwardly (i.e., towards the base frame 16) along the axis 44 (step 128 in FIG. 9). In addition, as the linkages $56_1$, $56_2$ rotate and the lever arms thereof retract, the piston rods $82_1$, $82_2$ coupled respectively to the linkages $56_1$, $56_2$ are pushed inward into the cylinder 24 along the axis 81, and the cylinder 24 is dragged inwardly along the axis 44 and the guide rod 78 (step 130 in FIG. 9).

The powertrain assembly 20 continues to operate causing the mold carrier 18 to be pulled inwardly until it is has reached the desired open position, at which time the powertrain assembly 20 may be deactivated, thereby stopping the movement of the mold carrier 18. Accordingly, in an embodiment, a determination is made as to whether the mold carrier 18 has reached the desired open position (step 132 in FIG. 9), and if so, the powertrain assembly 20, and the motor 46 thereof, in particular, is deactivated (step 134 in FIG. 9). In an embodiment, the ECU 14 is configured to determine when the mold carrier 18 has reached the desired open position, and to then deactivate the powertrain assembly 20. This determination may be made using any number of known techniques known in the art. For example, and as described above with respect to the closing of the molds 40, motor encoders associated with the motor 46 of the powertrain assembly 20 and/or displacement measurements of the carrier 18 may be used to determine when the mold carrier has reached a predetermined position, which, in an embodiment, may be an empirically-derived position stored in, for example, the memory 92 of the ECU 14.

There thus has been disclosed a system for use with a glassware forming machine that fully satisfy one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of actuating a mold operating mechanism, comprising the steps of:
   pushing a mold carrier of the mold operating mechanism outwardly along an axis to a closed position, thereby causing a piston rod to be pulled outwardly from a cylinder of the mold operating mechanism along a cylinder axis transverse to the axis along which the mold carrier is pushed and causing the cylinder to be dragged outwardly in the same direction in which the mold carrier moves; and
   pressurizing the cylinder to push the piston rod to apply clamping pressure to the mold carrier in the closed position of the mold carrier.

2. The method of claim 1, wherein the pushing step comprises a motor operatively coupled to the mold carrier pushing the mold carrier outwardly.

3. The method of claim 2, wherein the pushing step comprises a powertrain assembly including the motor and a gearbox pushing the mold carrier outwardly.

4. The method of claim 3, wherein the pushing step comprises a drivetrain assembly operatively coupled to the mold carrier and driven by the powertrain assembly and including a gearset and an operating shaft coupled to the gearset pushing the mold carrier outwardly.

5. The method of claim 4, wherein the pressurizing step is carried out by pressurizing the cylinder to push the piston rod to apply clamping pressure to a linkage coupled between the mold carrier and the operating shaft of the drivetrain assembly.

6. The method of claim 1, wherein pressurizing the cylinder comprises activating a fluid source fluidly coupled to the cylinder to supply fluid to the cylinder thereby pressurizing the cylinder.

7. The method of claim 1, wherein pressurizing the cylinder comprises activating a fluid source to supply fluid to the cylinder to thereby pressurize the cylinder.

8. A method of actuating a mold operating mechanism, comprising the steps of:
   activating a powertrain assembly of the mold operating mechanism to rotate an operating shaft of a drivetrain assembly of the mold operating mechanism to thereby rotate a linkage coupled to the operating shaft and to a mold carrier of the mold operating mechanism and thereby push the mold carrier outwardly along an axis to a closed position, thereby causing a piston rod to be pulled outwardly from a cylinder of the mold operating mechanism along a cylinder axis transverse to the axis along which the mold carrier is pushed and causing the cylinder to be dragged outwardly in the same direction in which the mold carrier moves; and pressurizing the cylinder to push the piston rod to apply clamping pressure to the linkage and, thus, to the mold carrier in the closed position of the mold carrier.

9. The method of claim 8, wherein the pressurizing step results in the piston rod applying clamping pressure to a knuckle of the linkage, wherein the knuckle is pivotably coupled to a first lever arm coupled to the operating shaft and to a second lever arm coupled to the mold carrier.

10. The method of claim 8, wherein pressurizing the cylinder comprises activating a fluid source fluidly coupled to the cylinder to supply fluid to the cylinder thereby pressurizing the cylinder.

11. The method of claim 8, wherein pressurizing the cylinder comprises activating a fluid source to supply fluid to the cylinder to thereby pressurize the cylinder.

* * * * *